US 8,456,557 B2

(12) United States Patent
Wang et al.

(10) Patent No.: US 8,456,557 B2
(45) Date of Patent: Jun. 4, 2013

(54) DYNAMIC RANGE EXTENSION FOR CMOS IMAGE SENSORS FOR MOBILE APPLICATIONS

(75) Inventors: Yibing Michelle Wang, Temple City, CA (US); Jeff Rysinski, Pasadena, CA (US); Hongyu Wang, San Gabriel, CA (US)

(73) Assignee: SK Hynix Inc., Gyeonggi-do (KR)

( * ) Notice: Subject to any disclaimer, the term of this patent is extended or adjusted under 35 U.S.C. 154(b) by 108 days.

(21) Appl. No.: 13/017,468

(22) Filed: Jan. 31, 2011

(65) Prior Publication Data
US 2012/0194722 A1 Aug. 2, 2012

(51) Int. Cl.
*H04N 5/335* (2011.01)
(52) U.S. Cl.
USPC .......................................... 348/297; 348/308
(58) Field of Classification Search
USPC ................. 348/272, 279, 280, 297, 308, 255, 348/273, 277, 362, 229.1
See application file for complete search history.

(56) References Cited

U.S. PATENT DOCUMENTS

| 6,734,905 | B2 | 5/2004 | Fossum et al. | |
|---|---|---|---|---|
| 6,864,916 | B1 | 3/2005 | Nayar et al. | |
| 7,605,855 | B2 | 10/2009 | Wang et al. | |
| 7,605,865 | B2 | 10/2009 | Lin | |
| 7,728,896 | B2 | 6/2010 | McKee | |
| 2004/0036775 | A1* | 2/2004 | Watson et al. | 348/207.1 |
| 2006/0125941 | A1* | 6/2006 | Baxter | 348/302 |
| 2007/0046807 | A1* | 3/2007 | Hamilton et al. | 348/362 |
| 2010/0309351 | A1* | 12/2010 | Smith et al. | 348/280 |
| 2011/0121421 | A1* | 5/2011 | Charbon et al. | 257/432 |
| 2012/0033097 | A1* | 2/2012 | Lim et al. | 348/222.1 |

\* cited by examiner

*Primary Examiner* — Tuan Ho
*Assistant Examiner* — Chan Nguyen
(74) *Attorney, Agent, or Firm* — William Park & Associates Patent Ltd.

(57) ABSTRACT

Aspects of the invention provide dynamic range extension for CMOS image sensors for mobile applications. An embodiment of the invention may comprise setting for each pixel in a pixel array one of a plurality of integration times and one of a plurality of signal gains, wherein the settings may be used to generate corresponding digital data for each pixel in the pixel array. The corresponding digital data for adjacent pixels for the same color plane may then be grouped into a superpixel, where each pixel has associated with it a different combination of integration time and signal gain.

28 Claims, 10 Drawing Sheets

DYNAMIC RANGE EXTENSION FOR CMOS IMAGE SENSORS FOR MOBILE APPLICATIONS

CROSS-REFERENCE TO RELATED APPLICATIONS/INCORPORATION BY REFERENCE

This application makes reference to U.S. patent application Ser. No. 13/018,100, filed on even date herewith.

The above stated application is incorporated by reference in its entirety.

FIELD OF THE INVENTION

Certain embodiments of the invention relate to image processing. More specifically, certain embodiments of the invention relate to dynamic range extension for CMOS image sensors for mobile applications.

BACKGROUND OF THE INVENTION

In a digital camera, light is passed through the camera lens to be exposed on an array of pixels having photodiodes such that the captured amount of light in each pixel can be converted into analog electric signals. The analog electrical signal from each pixel is amplified and converted into a digital signal via analog-to-digital conversion. The digital signal is then available for further digital processing to produce the captured image.

An image sensor in a digital camera or other digital imaging system performs the image production process from the pixels capturing light to the digital image output. Therefore, an image sensor is an important component in a digital image system for determining the quality of a final image. CMOS image sensors are widely used in applications requiring high speed performance and low power consumption as CMOS image sensors in general provide higher frame rate operation than the charge coupled devices (CCD). CMOS image sensors can also be formed in a very compact size chip with low power consumption and are used in digital camera implementations in various applications such as mobile phones, personal digital assistants, portable computers, etc.

CMOS image sensors may, however, suffer from high read noise, that is, low signal to noise ratio (SNR), and high fixed pattern noise, that is, low dynamic range (DR). CMOS image sensors provide lower signal to noise ratio (SNR) and smaller dynamic range (DR) than charge coupled devices.

Dynamic range is the ratio between the smallest and largest possible values of a measurable quantity, such as light, expressed as a base-10 logarithmic value (decibel, dB). The dynamic range quantifies the ability to adequately image both high lights and dark shadows in a scene. For example, the human sense of sight has a very high dynamic range, as the human eyes can see objects in bright sunlight and also in a moonless night. The human eye has a dynamic range of around 200 dB.

As the dynamic range of a typical mobile sensor is usually around 60 dB, it appears almost impossible for today's electronic digital imaging equipment to reproduce the full dynamic range experienced by human eyes. Nevertheless, enhancing the dynamic range of the image sensors is one of the research goals of the industry.

Generally, the dynamic range can be extended by adding more hardware on chip to store more light information either in analog domain or digital domain, such as adding more devices in each pixel to increase charge collecting capability, or adding more frame and/or line memory to save images of different exposures, or adding optical masks to vary sensitivities of different pixels. These kinds of hardware solutions have serious limitations in mobile applications because the pixel size is so small that it cannot allow more transistors in the pixel, and the small module size of the mobile devices also limits the size of extra memory on chip, and the small size of the pixels also limits the performance and uniformity of the optical masks.

More specifically, the following techniques including multiple integration, logarithmic sensors, dual sensitivity pixels, and spatial-varying sensitivity pixels have been proposed to improve the dynamic range of the image sensors. However, all of these techniques are considered inadequate.

The multiple integration approach needs extra memory to store full or partial images of different integrations before processing them. The logarithmic sensor approach has high pixel response non-uniformity so that it is bad for color response. The dual sensitivity pixels approach needs extra transistors and/or storage inside the pixel, so the pixel size is hard to shrink.

Spatial-varying sensitivity pixels approach uses different optical masks on different pixels to subsample light information on the same pixel array, and the sensitivity of each pixel cannot be varied at different lighting conditions. Moreover, the pixel response is nonlinear. Accordingly, the pixel response is nonlinear, and for this reason, the pixel response technique requires that the light response of the sensor be calibrated fully and a lookup table be created. The extra filters also add cost.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide dynamic range extension for CMOS image sensors for mobile applications. An embodiment of the invention may comprise setting for each pixel in a pixel array one of a plurality of integration times and one of a plurality of signal gains, wherein the settings may be used to generate corresponding digital data for each pixel in the pixel array. The corresponding digital data for adjacent pixels for the same color plane may then be grouped into a superpixel, where each pixel has associated with it a different combination of integration time and signal gain.

A system for processing images may comprise pixel configuration circuitry enabled to set for each pixel in a pixel array one of a plurality of integration times and one of a plurality of signal gains. The system may also comprise a plurality of column analog-to-digital converters enabled to generate a corresponding digital data for each pixel in the pixel array. There may also be a digital processing circuitry enabled to group into a superpixel the corresponding digital data for adjacent pixels for the same color plane, wherein each pixel has associated with it a different combination of integration time and signal gain.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

A further understanding of the nature and advantages of examples provided by the disclosure may be realized by reference to the remaining portions of the specification and the drawings wherein like reference numerals are used throughout the several drawings to refer to similar components. In some instances, a sub-label is associated with a reference numeral to denote one of multiple similar components. When reference is made to a similar numeral without specification to an existing sub-label, the reference numeral refers to all such similar components.

DETAILED DESCRIPTION OF THE INVENTION

The following description provides exemplary embodiments only and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments the methods may be performed in an order different than that described, and that various steps may be added, omitted, or combined. Also, features described with respect to certain embodiments may be combined in various other embodiments. Different aspects and elements of the embodiments may be combined in a similar manner.

It should also be appreciated that the following systems and methods may be components of a larger system, wherein other procedures may take precedence over or otherwise modify their application. Also, a number of steps may be required before, after, or concurrently with the following embodiments.

Embodiments of the present invention will be described in detail with reference to the accompanying drawings such that the scope of the present invention can be easily embodied by those skilled in the art.

Certain embodiments of the invention may be found in a method and system for dynamic range extension for CMOS image sensors for, but not limited to, mobile applications. The dynamic range of a CMOS image sensor with low pixel dynamic range and limited analog-to-digital conversion (ADC) resolution are extended, especially for the mobile imaging sensors with small number of pixels.

Figure 1:
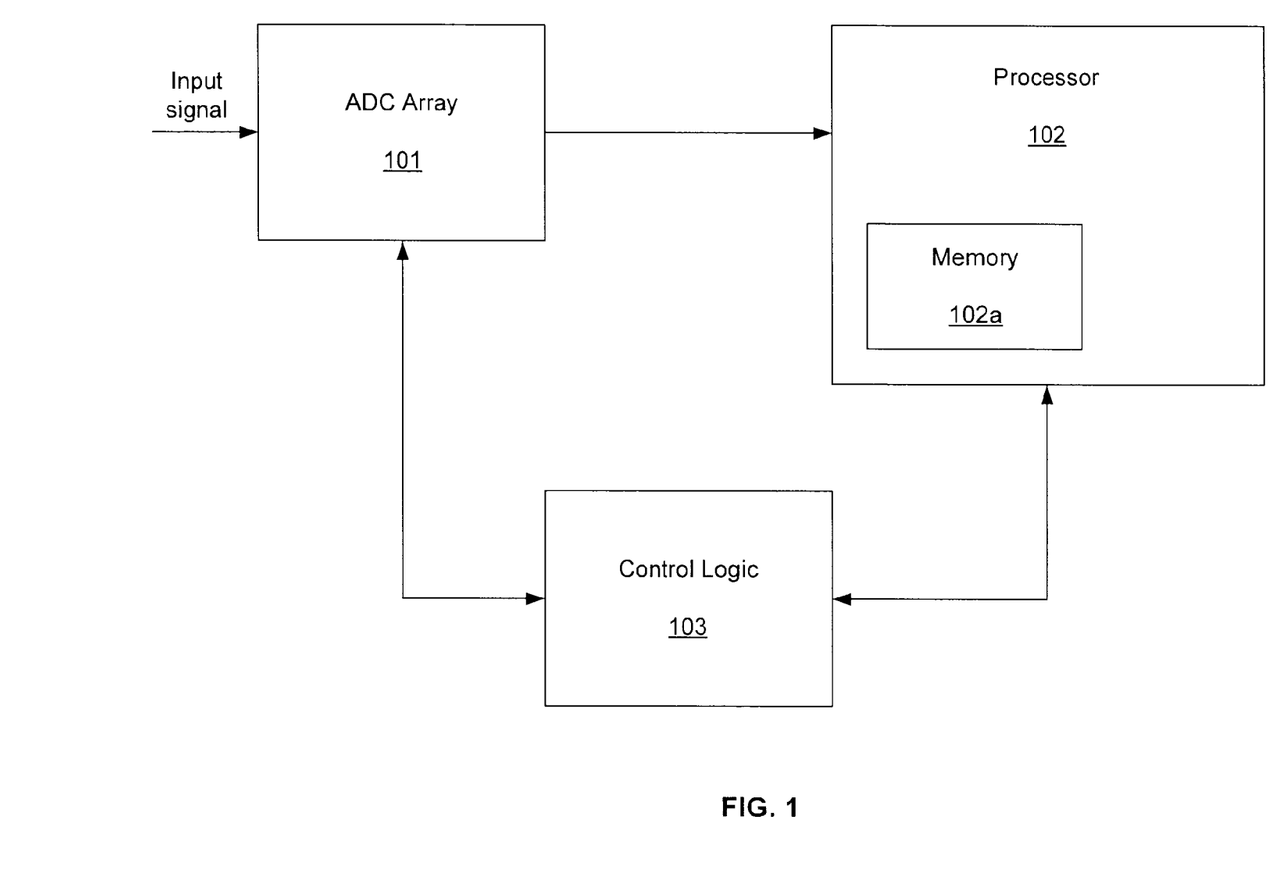
FIG. 1 is a block diagram of exemplary system for analog to digital conversion that may be used in accordance with an embodiment of the invention.

FIG. 1 is a block diagram of exemplary system for analog to digital conversion that may be used in accordance with an embodiment of the invention. Referring to FIG. 1, there is shown a portion of a circuitry for processing input data, comprising the ADC 101, the processor 102, and the control logic 103.

The ADC 101 converts input analog signals, such as, for example, pixel signals from a video image sensor (not shown in FIG. 1) to equivalent digital signals. The digital signals output by the ADC 101 may be further processed by the processor 102. The processor 102 may, for example, use digital signal processing methods to compress the digital signals from the ADC 101 to a standard video format such as H.263 or H.264. The processor 102 may also comprise a memory block 102a where code may be stored. This code may be executed by the processor 102 to perform various functions such as, for example, digital signal processing. The memory block 102a may also be used to store digital signals from the ADC 101 and/or digital signals that result from processing the digital signal from the ADC 101.

The control logic 103 may comprise circuitry that generates clocks, control and enable signals, and commands for a variety of modules, such as the ADC 101. For example, the control logic 103 may generate a clock signal that is used for counting in the ADC 101, where the clock signal is not continuously running. A running clock comprises pulses while a non-running clock is in either a low state or a high state. The control logic 103 may also output enable signals that enable the counters in the ADC 101 to count during specific portions of time, and also reset signals.

Figure 2:
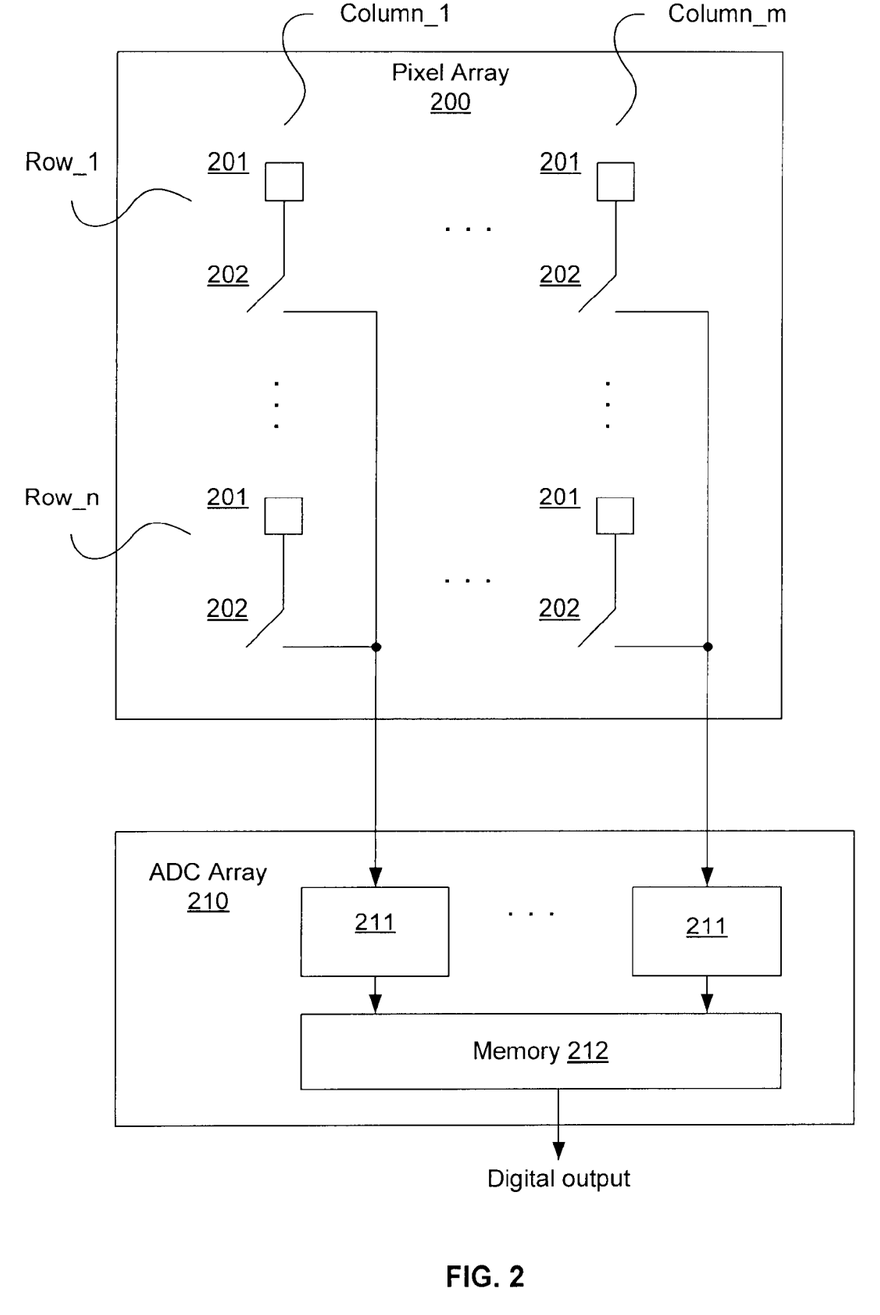
FIG. 2 is a block diagram of an exemplary system for column parallel analog digital converters that may be used in accordance with an embodiment of the invention.

FIG. 2 is a block diagram of an exemplary column parallel analog digital converter configuration that may be used in accordance with an embodiment of the invention. Referring to FIG. 2, there are shown a pixel array 200 and an ADC array 210. The pixel array 200 may comprise pixel elements 201 and switching elements 202. The pixel elements 201 may comprise suitable circuitry that outputs, for example, voltage proportional to an amount of light detected by the pixel element 201. The pixel element 201 may be sensitive to specific wavelengths of the incident light. The ADC array 210 may comprise, for example, an array of ADC elements 211, where each ADC element 211 may correspond to a column of the pixel elements 201. The outputs of the ADC elements 211 may be stored in a memory block 212.

In operation, appropriate control signals from, for example, the control logic 103 may enable the switching elements 202 to open and close appropriately so that output voltage from a particular pixel element 201 is communicated to the ADC array 210. Accordingly, for each column Column_1 to Column_m, only one particular switch element 202 in all of the rows Row_1 to Row_n may be closed during a row scan time so that output voltage from the corresponding pixel element 201 is communicated to the ADC array 210 during that scan time. Therefore a true pixel voltage may be communicated to a corresponding ADC element 211 when only one pixel is selected for the column.

The output voltage from one of the pixel elements 201 in each of the columns Column_1 to Column_m may be converted to equivalent digital values by the corresponding ADC elements 211. However, since there is a plurality of ADC elements 211, each ADC element 211 may need to be calibrated so that each ADC element 211 outputs a similar digital value for a given input. Calibration may be done periodically, for example, such as once during a row scan time or once during a frame. The particular period for calibration may be design and/or implementation dependent.

While FIG. 2 may have been drawn and described as the pixel array 200 having switching elements 202 for the sake of clarity, the invention need not be so limited. For example, the switching elements 202 may be part of the ADC array 210.

Figure 3:
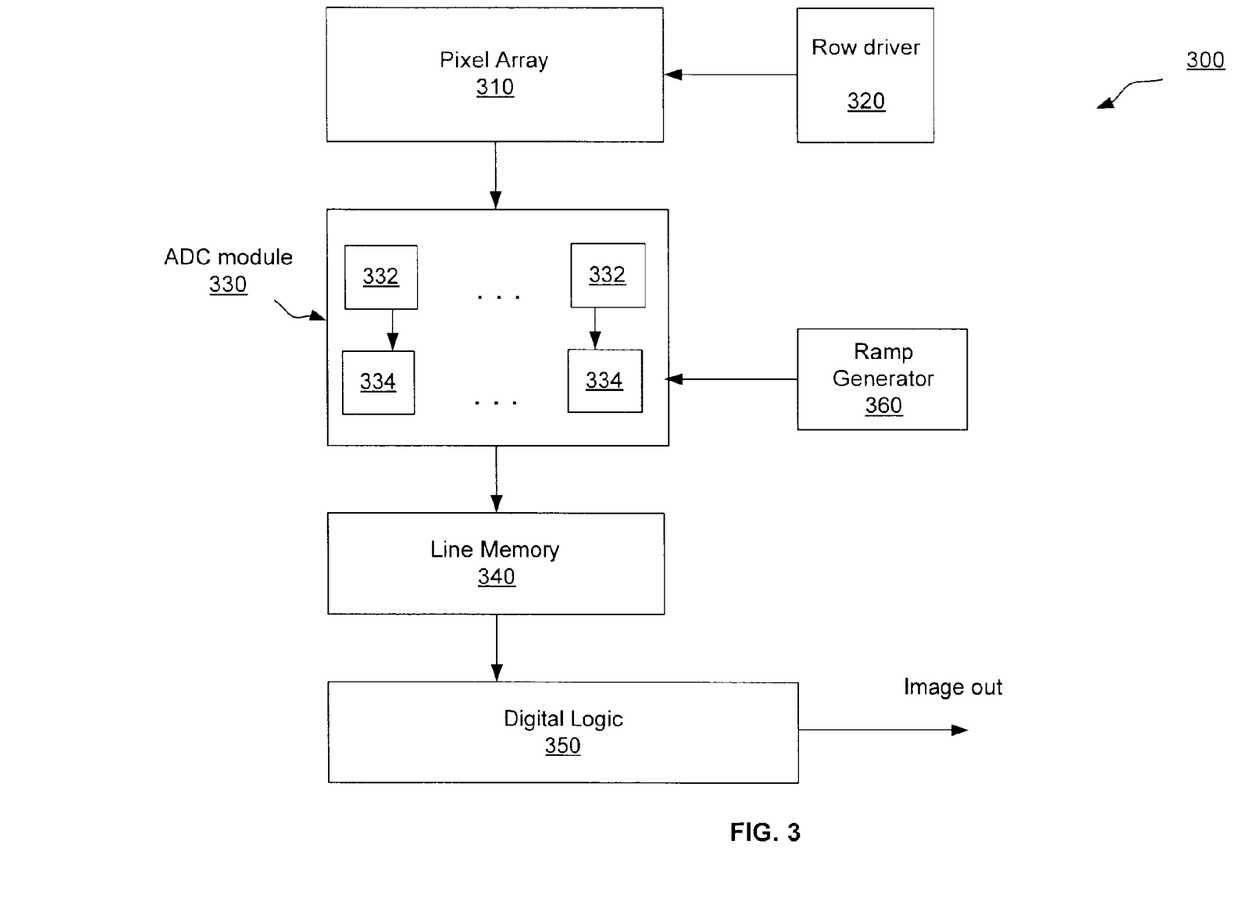
FIG. 3 is a block diagram of an exemplary system for analog to digital conversion in accordance with an embodiment of the invention.

FIG. 3 is a block diagram of an exemplary system for analog to digital conversion in accordance with an embodiment of the invention. Referring to FIG. 3, there is shown an analog to digital conversion system 300 comprising a pixel array 310, a row driver 320, an ADC module 330, line memory 340, digital logic block 350, and a ramp generator 360. The ADC module 330 comprises column CDSs 332 and column ADCs 334.

The pixel array 310 may be similar to, for example, the pixel array 200 shown in FIG. 2. The row driver 320 may comprise suitable circuitry that can generate word lines that may be used to select a particular row, for example, Row_1 in FIG. 2, to output signals. The ADC module 330 may comprise column CDSs 332 that may be suitable to sample analog signals from the pixel array 310. The column ADCs 334 in the ADC module 330 may be used to convert sampled signals from the column CDSs 332 to digital data. The line memory 340 may comprise suitable circuitry, such as, for example, latching circuitry, for storing digital data from the ADC module 330. The digital logic block 350 may comprise suitable circuitry for processing the digital data from the line memory 340. The digital logic block 350 may comprise various logic circuits and/or digital signal processor, for example. The ramp generator 360 may generate a reference ramp signal that may be used to determine digital data equivalents for the sampled signals.

In operation, rows of pixels in the pixel array 310 are addressed through the horizontal word lines output by the row driver 320. The charges or the voltage signals output by a row of the pixel array 310, for example, Row_1 in FIG. 2, are communicated to the ADC module 330 via column bit lines. Pixel elements in the pixel array 310 are arranged in a two-dimensional structure similar to FIG. 2, where the row driver 320 controls a particular row to output its pixel signal onto the column bit lines. Accordingly, every pixel in a row will output its signal in parallel.

A plurality of column CDSs 332 in the ADC module 330 samples pixel signals on the column bit lines, and the sampled pixel signals are then converted to an equivalent digital data by the column ADCs 334. The column CDSs 332 may use, for example, correlated double sampling, which is a technique for measuring electrical values such as voltages or currents that allows for removal of an undesired offset. It is used quite frequently when measuring sensor outputs. The output of the pixel is measured twice, first the reset level of the pixel and second the signal level of the pixel. The difference of the two represents the incident light intensity. Both of these levels include offset caused by thermal noise and device mismatch. By taking a difference of the two, this offset is cancelled out.

The two dimension array of pixel elements 201 in the pixel array 310 is organized into rows and columns. The pixel elements 201 in a given row share reset lines, so that all the pixel elements 201 in a row are reset at the same time. The pixel elements 201 in a row are also tied to a word line, and generally, only one row in the pixel array 310 may be selected. Accordingly, although a plurality of pixel elements 201, for example, Column_1 in FIG. 2, in the pixel array 310 share the same column bit line, since only one row is selected at any given time, the pixel signal on a column bit line is not deteriorated by mixing with signals from other pixel elements 201 in the column.

Each column CDS 332 in the ADC module 330 first samples a reset signal and then receives a pixel signal from the pixel array 310. The column CDS 332 then obtains the difference between the reset signal and the pixel signal. The corresponding column ADC 334 then compares the difference signal with the reference ramp signal that may be output by the ramp generator 360. When the reference ramp signal first starts to ramp, a counter (not shown) may be enabled in each column ADC 334 in the ADC module 330. When the level of the difference signal is the same as the level of the reference ramp signal, the corresponding counter will be stopped and the count will be stored in a corresponding portion of the line memory 340. This count is the digital data equivalent to the input pixel signal.

The digital logic block 350 may read the digital data stored in the line memory 340 and may process the digital signals. For example, in an embodiment of the invention, the digital logic block 350 may perform digital signal processing to convert the digital data to one of various video formats such as H.263 or H.264. Accordingly, the digital logic block 460 may output digital data ImageOut.

Various embodiments of the invention may allow for different analog gain for the signals converted by the column ADCs 334. The gain may be from, for example, variable gain amplifiers in the column CDSs 332 or from varying slopes for the reference ramp signals for the column ADCs 334 that may be single-slope ADCs. Other types of ADCs may require other methods of adjusting gain. For example, SAR or cyclic ADCs may require different references to adjust their gains. Various embodiments of the invention that use two gain values may refer to the two gain values as "low gain" and "high gain." Although two gain values are specified for exemplary purposes, the invention need not be so limited. Various embodiments may use three or more gain values.

Control signals for the various modules described in FIG. 3 may be presumed to be generated within each block, or by the catch-all digital logic block 350. This assumption makes descriptions simpler and will be used for the remaining figures as well.

Figure 4:
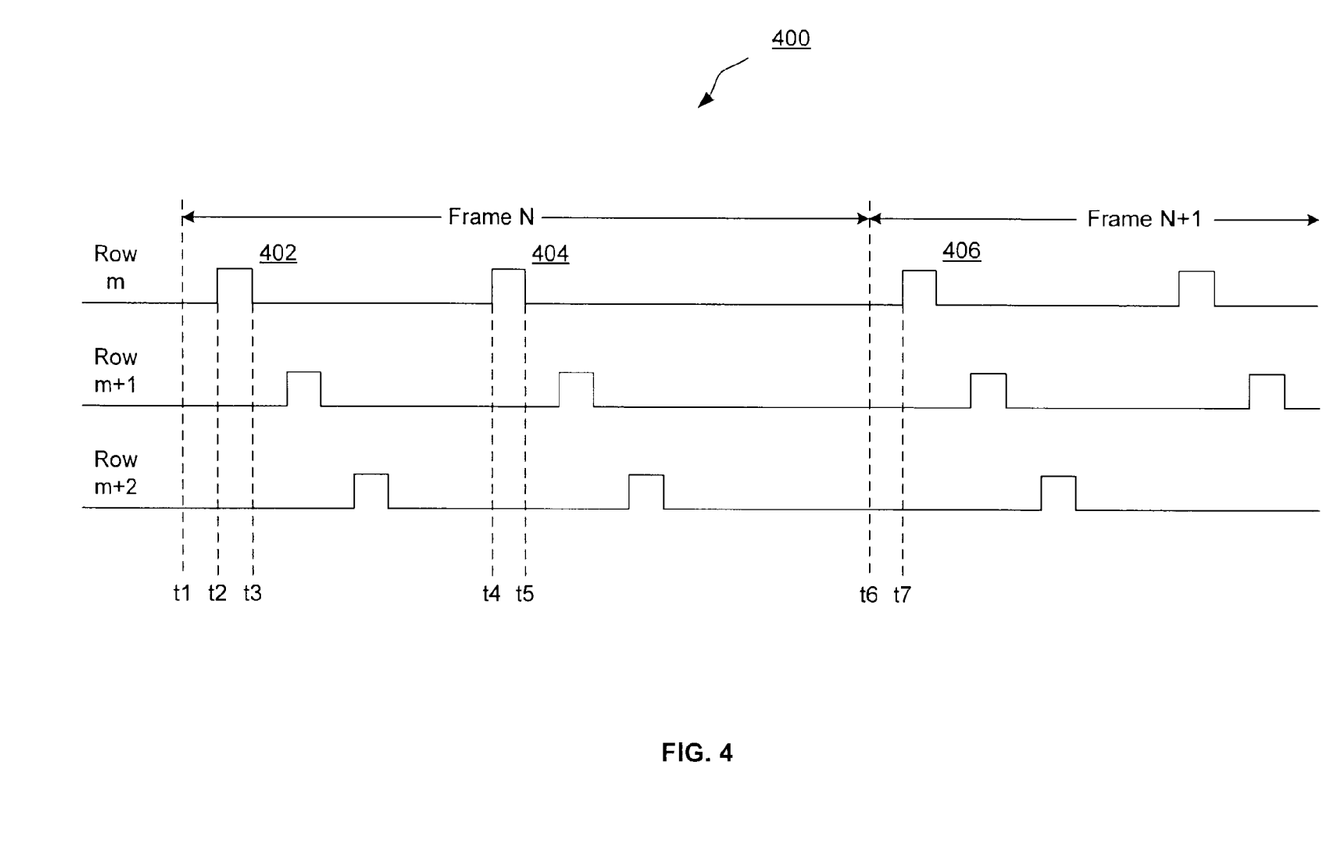
FIG. 4 is a timing diagram of an exemplary system for analog to digital conversion in accordance with an embodiment of the invention.

FIG. 4 is a timing diagram of an exemplary system for analog to digital conversion that may be used in accordance with an embodiment of the invention. Referring to FIG. 4, there is shown three exemplary rows m, m+1, and m+2, where the horizontal axis denotes time. The three rows m, m+1, and m+2 each have similar events that occur, and they are shown for relative timing differences. Accordingly, only actions corresponding to the row m will be discussed.

At time t1, row m may be at the start of a frame N. During a time period from time t2 to time t3, row m may be reset by a first reset pulse 402. The first reset pulse 402 will clear the pixel elements 201 in row m of the pixel array 310 to a known state so that the pixel elements 201 may accumulate photoelectrons for the present frame. Additionally, the equivalent digital data converted from analog signals from the pixel elements 201 for row m of the previous frame by the column ADCs 334 may be read out to the line memory 340 after the first reset pulse 402 is asserted.

The time period from time t3 to time t4 may vary to allow different integration times for the pixel elements 201 in different rows. An embodiment of the invention may allow two different integration times. The two integration times may be referred to as a "short integration time" and a "long integration time." The time period from time t3 to time t4, which may be referred to as pre-integration period, will be shorter for a long integration time than for a short integration time. Long integration time may be beneficial for low light scenes, while for bright light scenes, the integration time can be set shorter. Although two integration times are specified for exemplary purposes, the invention need not be so limited. For example, various embodiments may use three or more integration times.

During a time period from time t4 to time t5, row m may be reset prior to integration by a second reset pulse 404. This second reset pulse 404 serves a similar purpose as the first reset pulse 402 to reset the pixel elements 201 to a known state so that they may be ready to accumulate photoelectrons. However, there is no readout of digital data during the second reset pulse 404.

During the time t5 to time t6, the pixel elements 201 in row m may accumulate photoelectrons until the integration period ends at time t6. The integration time from time t5 to time t6 will be longer for a long integration time than for a short integration time since the pre-integration period is shorter for the long integration time than for the short integration time.

The charge at each pixel element 201 for the row m will then be communicated to the corresponding column ADC 334 by each column CDS 332. A counter in each ADC 334 will then count as described with respect to FIG. 3 to generate an equivalent digital data. The count will be read out after time t6. Various embodiments of the invention may use the start of the third reset pulse 406 at time t7 to read out the digital data to store in the line memory 340.

Figure 5:
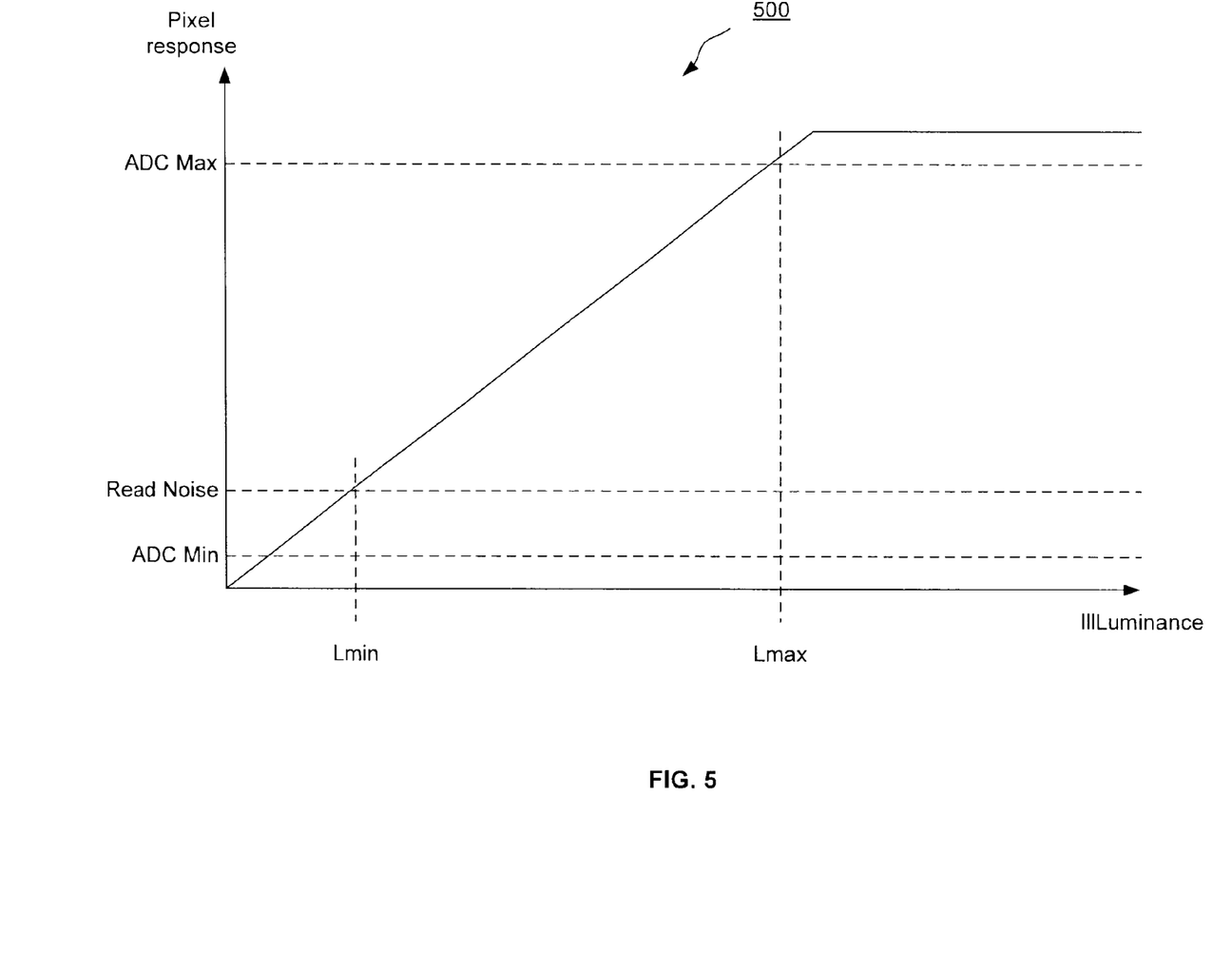
FIG. 5 is an exemplary graph for pixel response in accordance with an embodiment of the invention.

FIG. 5 is an exemplary graph for a pixel response in accordance with an embodiment of the invention. Referring to FIG. 5, there is shown a graph 500 where the horizontal axis denotes illuminance and the vertical axis denotes pixel response. The pixel response, which may be an analog signal from the pixel elements 201, may also be expressed as the converted digital data from the column ADCs 334.

Accordingly, the column ADC 334 may be calibrated to be able to count from the ADC Min level of the pixel response to the ADC Max level of the pixel response. However, because of noise inherent in circuits, the column ADC 334 may not be able to distinguish pixel response lower than Read Noise level. Accordingly, the illuminance Lmin associated with the Read Noise level may be the minimum illuminance detected. The maximum illuminance detected may be illuminance Lmax.

Accordingly, the dynamic range of the column ADC 334 can be expressed as:

$$DR = 20\log(Lmax/Lmin) \quad \text{(Equation 1)}$$
$$= 20\log[(ADC\ Max)/(Read\ Noise)].$$

To extend the dynamic range of the sensor, the readout timing may be modified such that the adjacent rows in the same color plane may have different integration times. One row may have a long integration time while an adjacent row may have a short integration time. The pixels with long integration time will capture the low light information of the scene and the pixels with the short integration time will capture the high light information of the scene.

And since the column ADCs have limited resolution, during the column readout time, different analog gains may be applied to adjacent columns. For example, one column may have high gain and an adjacent column may have low gain. The specific integration times and gain settings may be selected according to the global or local brightness of the scene. The global or local brightness may be determined by circuitry that is capable of processing digital data from one or more previous frames such as, for example, the processor 102 or the digital logic block 350.

The integration times and gain settings may be dynamically adjusted, for example, by circuitry such as the processor 102, the control logic 103, and/or the digital logic 350 after every frame or after a given number of frames where global or local brightness of a scene in one or more previous frames is used to determine the integration times and gain settings. The integration times and gain settings may also be left to default values.

Figure 6:
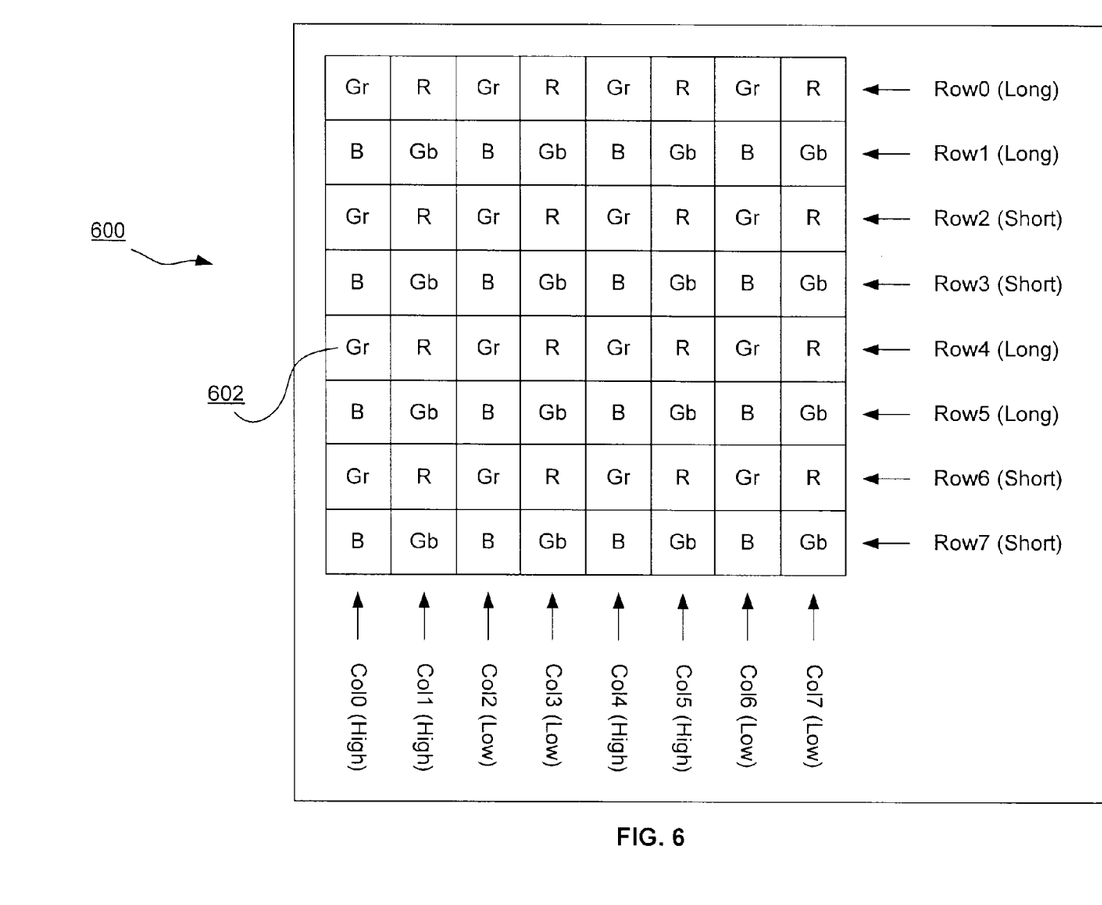
FIG. 6 is a drawing of exemplary pixel processing configuration in accordance with an embodiment of the invention.

FIG. 6 is a drawing of exemplary pixel processing configuration in accordance with an embodiment of the invention. Referring to FIG. 6, there is shown a pixel array 600 comprising individual pixel elements 602, which may be similar to the pixel elements 201. Each pixel element 602 may be configured to be sensitive to a specific frequency of a color plane denoted as R, B, Gr, and Gb. The rows of the pixel array 600 may have different integration times as shown. For example, rows Row0, Row1, Row4, and Row5 may have long integration times while Row2, Row3, Row6, and Row7 may have short integration times. The columns of the pixel array 600 may be configured to have different analog gain. For example, columns Col0, Col1, Col4, and Col5 may have high gain while columns Col2, Col3, Col6, and Col7 may have low gains.

Accordingly, it can be seen that a pixel element 602 may be correlated to one of four types of pixel response depending on the specific manner in which the pixel element 602 is controlled and its output is processed. The pixel element 602 may be associated with, for example, a long integration time and a high gain, a long integration time and a low gain, a short integration time and a high gain, and a short integration time and low gain.

For example, the Gr pixel element 602 at the intersection of Row0 and Col0 is associated with long integration time and high gain. The Gr pixel element 602 at the intersection of Row0 and Col2 is associated with long integration time and low gain. The Gr pixel element 602 at the intersection of Row2 and Col0 is associated with short integration time and high gain. The Gr pixel element 602 at the intersection of Row2 and Col2 is associated with short integration time and low gain.

If a slope of a reference ramp signal is used to vary a gain setting, the ramp generator 360 may need to provide a high gain ramp signal to the corresponding column ADCs 334 that require a high gain and a low gain ramp signal to the corresponding column ADCs 334 that require a low gain.

Figure 7:
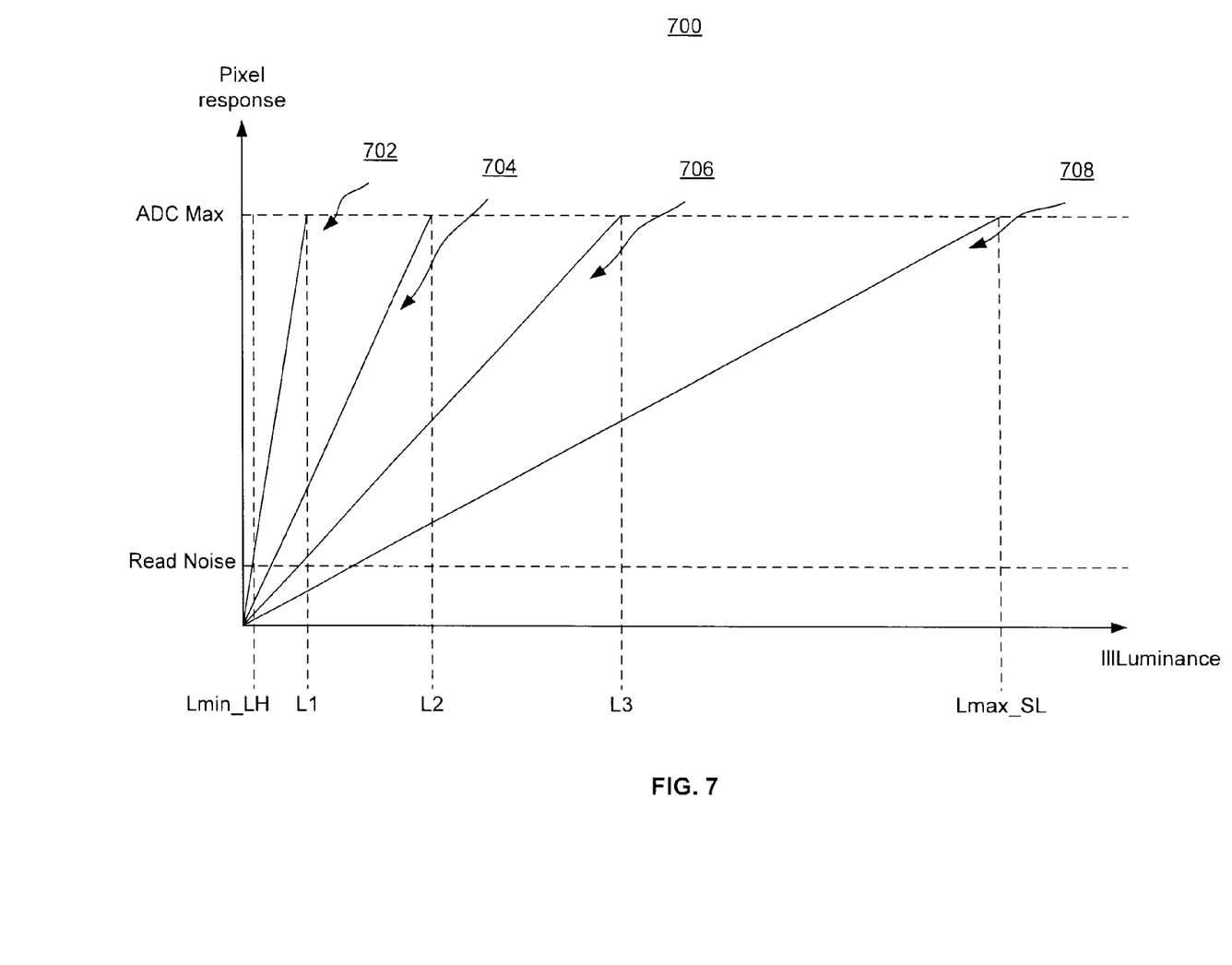
FIG. 7 is a graph of exemplary pixel response in accordance with an embodiment of the invention.

FIG. 7 is a graph of exemplary pixel response in accordance with an embodiment of the invention. Referring to FIG. 7 there is shown a graph 700 with pixel responses for the four different types of pixel responses. The pixel response 702 is for a pixel element 602 associated with long integration time and high gain. The pixel response 704 is for a pixel element 602 associated with long integration time and low gain. The pixel response 706 is for a pixel element 602 associated with short integration time and high gain. The pixel response 708 is for a pixel element 602 associated with short integration time and low gain. Each pixel response has a dynamic range defined by the Equation 1. Accordingly, the extended dynamic range for the four pixels that are combined can be expressed as:

$$DRext = 20\log(Lmax\_SL/Lmin\_LH) \qquad \text{(Equation 2)}$$
$$= DR + 20\log[(\text{Long Integration Time}/$$
$$\text{Short Integration Time}) * (\text{High Gain}/\text{Low gain})]$$

Figure 8:
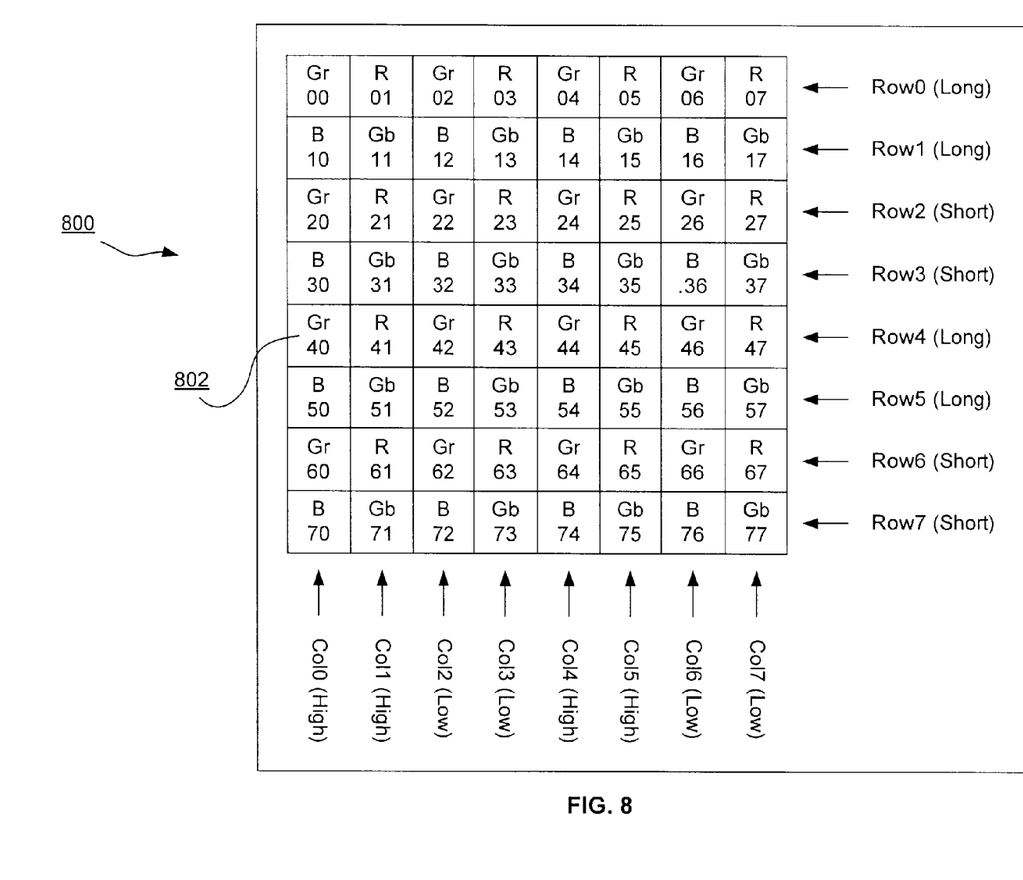
FIG. 8 is a drawing of exemplary pixel processing configuration in accordance with an embodiment of the invention.

Since an output image is generated by varying gain and integration time settings during readout, the output of each pixel needs to be normalized to reflect its real brightness information. FIG. 8 describes an embodiment of the invention that reconstructs the final image by creating a super pixel that aggregates four adjacent pixels of different settings on the same color plane. Accordingly, the final image has a resolution that is reduced by a factor of four.

Figure 9:
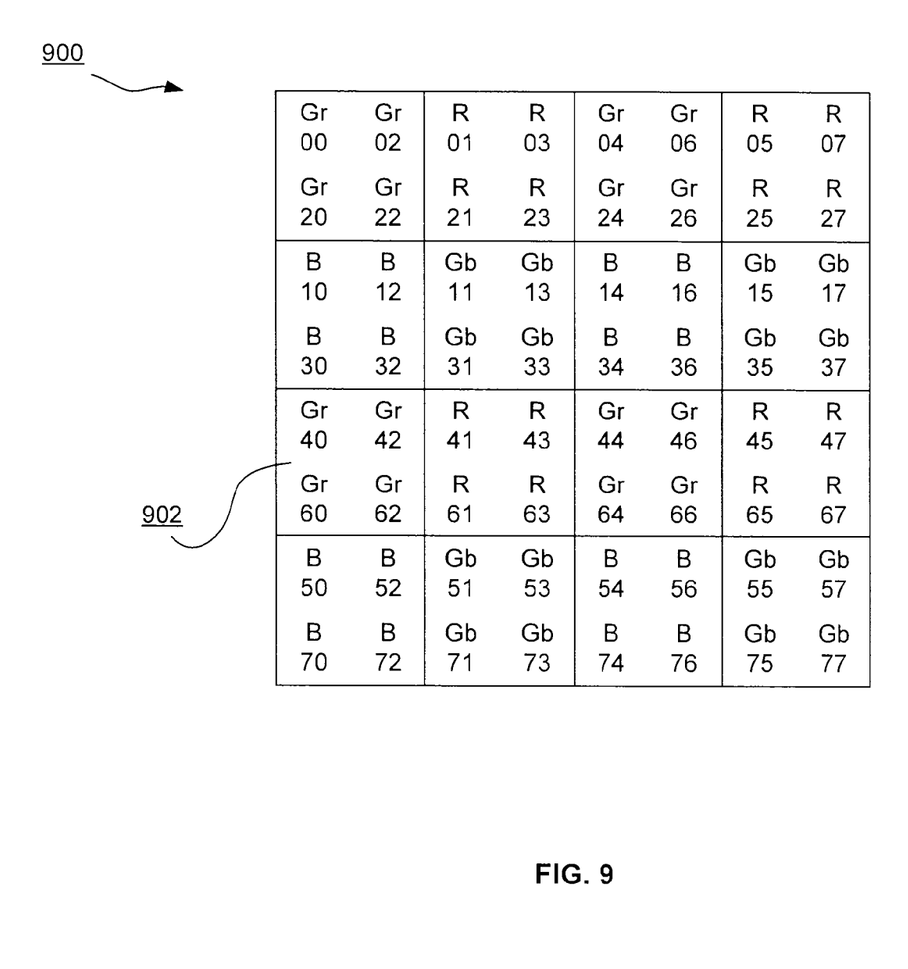
FIG. 9 is a drawing of exemplary modified image output in accordance with an embodiment of the invention.

FIG. 8 is a drawing of exemplary pixel processing configuration in accordance with an embodiment of the invention. FIG. 8 is similar to FIG. 6 except that each pixel 802 is labeled with a row number and a column number to make easier the description of FIG. 9. FIG. 9 shows the pixels in FIG. 8 after they have been grouped in their respective color planes so that each group comprises all four of the pixel responses.

FIG. 9 is a drawing of exemplary modified image output in accordance with an embodiment of the invention. Referring to FIG. 9, there is shown the modified image output 900, where four pixels in the same color plane form a superpixel 902. Each superpixel 902 comprises a pixel with one of the pixel responses described with respect to FIG. 7. The dynamic range of the superpixel 902 is the sum of the dynamic ranges of the four pixels. Accordingly, it can be seen that the dynamic range of the superpixel 902 has increased as determined by Equation 2 with respect to a dynamic range of the individual pixels.

Figure 10:
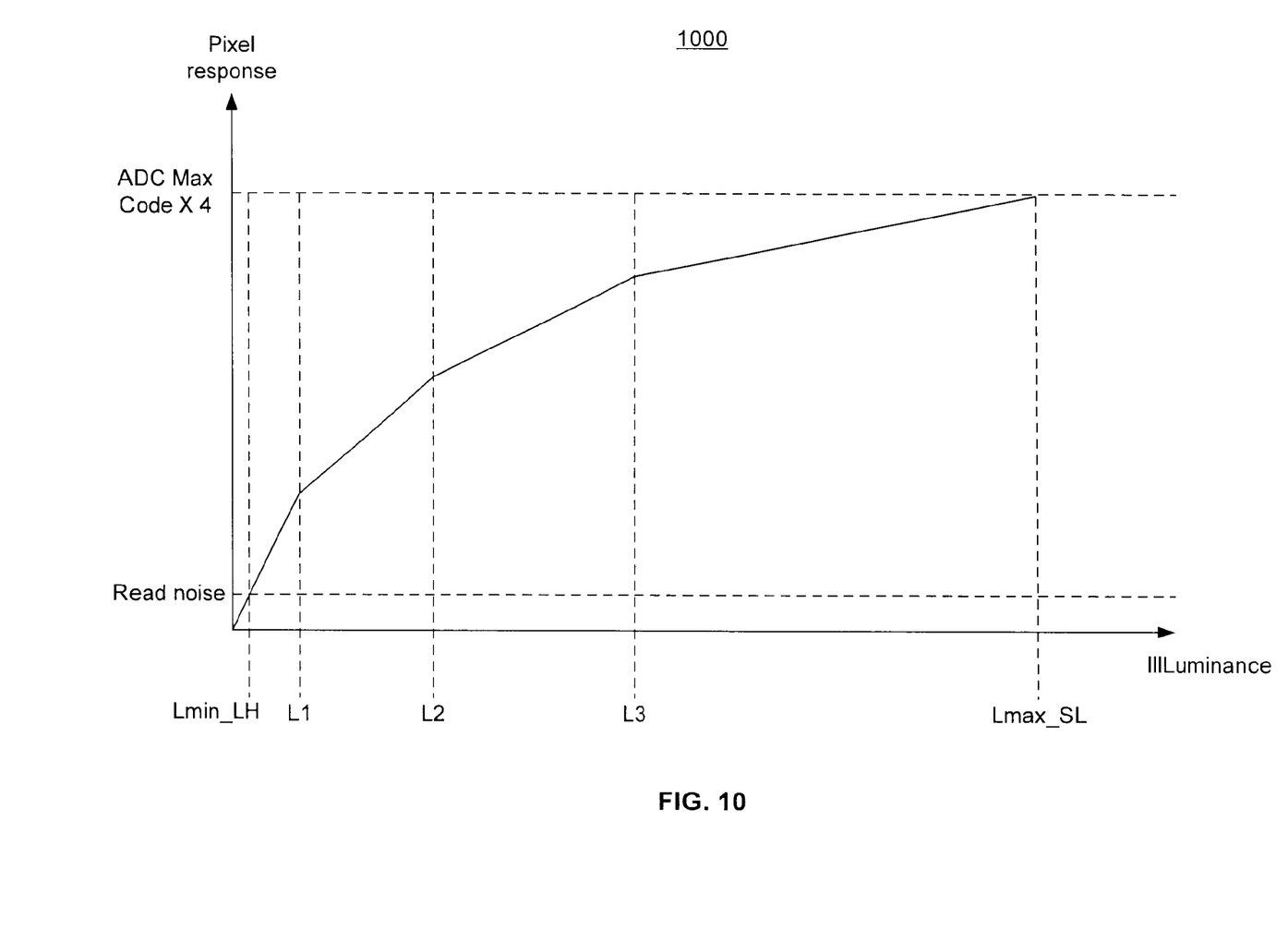
FIG. 10 is a drawing of output response for the modified image output of FIG. 9 in accordance with an embodiment of the invention.

FIG. 10 is a drawing of output response for the modified image output of FIG. 9 in accordance with an embodiment of the invention. Referring to FIG. 10, there is shown a graph 1000 of pixel response for the superpixels 902 of FIG. 9. The pixel response may be a piecewise linear pixel response of the four pixels in the superpixel 902.

Accordingly, an embodiment of the present invention discloses a new readout scheme directed to, inter alia, applying at least two integration times and at least two ADC input ranges to the readout path to capture high dynamic range information of a scene. To extend the dynamic range on mobile imaging sensors different integration time to different rows of pixels is applied, and different gains to different columns of pixels are applied. The integration time and gain settings can be varied according to the local and global brightness of the image.

The adjacent pixels can be combined together to create a high dynamic range pixel. As a result, the output image is a higher dynamic range image with reduced spatial resolution.

The new readout scheme allows capture of high intra-scene dynamic range images without changing the pixel architecture. It works for all size of pixels, and also works well with mobile sensors although the pixel size has become small, the chip size is limited, and the cost has to be kept low.

Various embodiments of the invention may have been described with applying the different gains and integration times for all the pixels of a frame. However, the invention need not be so limited. For example, when a local portion of a frame is very bright, various embodiments of the invention may provide dynamic range extension for only that local portion of the frame. However, this may require additional circuitry beyond that needed for dynamic range extension for the entire frame.

Although various embodiments of the invention has been described, the invention is not so limited. For example, while two integration times and two gain values may have been discussed for an exemplary embodiment, other embodiments of the invention may have two or more integration times and/or two or more gain values.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing images, the method comprising:
    setting for each pixel in a pixel array one of a plurality of integration times and one of a plurality of signal gains;
    generating corresponding digital data for each pixel in the pixel array by applying different integration times to different rows of pixels, and different signal gains to different columns of pixels; and
    grouping into a superpixel the corresponding digital data for adjacent pixels for the same color plane, wherein each of the adjacent pixels has associated with it a unique combination of integration time and signal gain.

2. The method according to claim 1, wherein the integration time is one of long integration time and short integration time.

3. The method according to claim 1, wherein setting of the integration time is dependent on at least one of global brightness information and local brightness information.

4. The method according to claim 1, wherein the signal gain is one of high gain and low gain.

5. The method according to claim 1, wherein setting of the signal gain is dependent on at least one of global brightness information and local brightness information.

6. The method according to claim 1, wherein there are four combinations of integration time and signal gain.

7. The method according to claim 1, wherein the superpixel has a piecewise linear response to incoming light intensity.

8. The method according to claim 1, wherein the integration time and signal gain for a pixel are dynamically set.

9. The method according to claim 1, wherein the signal gain is controlled by varying a gain of a variable gain amplifier.

10. The method according to claim 1, wherein the signal gain is controlled by varying a slope of a ramp signal for a column analog-to-digital converter.

11. A system for processing images, the system comprising:
    pixel configuration circuitry enabled to set for each pixel in a pixel array one of a plurality of integration times and one of a plurality of signal gains;
    column analog-to-digital converter enabled to generate a corresponding digital data for a pixel in the pixel array by applying different integration times to different rows of pixels, and different signal gains to different columns of pixels; and digital processing circuitry enabled to group into a superpixel the corresponding digital data for adjacent pixels for the same color plane, wherein each of the adjacent pixels has associated with it a unique combination of integration time and signal gain.

12. The system according to claim 11, wherein the integration time is one of long integration time and short integration time.

13. The system according to claim 11, wherein setting of the integration time is dependent on at least one of global brightness information and local brightness information.

14. The system according to claim 11, wherein the signal gain is one of high gain and low gain.

15. The system according to claim 11, wherein setting of the signal gain is dependent on at least one of global brightness information and local brightness information.

16. The system according to claim 11, wherein there are four combinations of integration time and signal gain.

17. The system according to claim 11, wherein the superpixel has a piecewise linear response to incoming light intensity.

18. The system according to claim 11, wherein the integration time and signal gain for a pixel are dynamically set.

19. The system according to claim 11, wherein the signal gain is controlled by varying a gain of a variable gain amplifier.

20. The system according to claim 11, wherein the signal gain is controlled by varying a slope of a ramp signal for a column analog-to-digital converter.

21. The method according to claim 1, wherein an output image derived from a plurality of superpixels is a relatively high dynamic range image having reduced spatial resolution.

22. The method according to claim 21, wherein the relatively high dynamic range is approximately equal to a sum of dynamic ranges for each pixel that is grouped into the superpixel.

23. The method according to claim 21, wherein dynamic range for an individual pixel is given by the equation:

$$DR = 20\log\left[\frac{(ADC\ Max)}{(Read\ Noise)}\right];$$

where:

DR is dynamic range;

ADC Max is analog-to-digital converter maximum measurable level of pixel response; and Read Noise is analog-to-digital converter noise floor, corresponding to minimum measurable level of pixel response.

24. The method according to claim 23, wherein the relatively high dynamic range for the superpixel is given by the equation:

$$DRext = DR + 20\log\left[\left(\frac{Long\ Integration\ Time}{Short\ Integration\ Time}\right)*\left(\frac{High\ Gain}{Low\ Gain}\right)\right];$$

where:

DRext is extended dynamic range of the superpixel;

DR is dynamic range for a single pixel member of the superpixel;

Long Integration Time is a relatively long integration time associated with a single pixel member of the superpixel;

Short Integration Time is a relatively short integration time associated with a single pixel member of the superpixel;

High Gain is a relatively high signal gain associated with a single pixel member of the superpixel; and Low Gain is a relatively low signal gain associated with a single pixel member of the superpixel.

25. The system according to claim 11, wherein an output image derived from a plurality of superpixels is a relatively high dynamic range image having reduced spatial resolution.

26. The system according to claim 25, wherein the relatively high dynamic range is approximately equal to a sum of dynamic ranges for each pixel that is grouped into the superpixel.

27. The system according to claim 25, wherein dynamic range for an individual pixel is given by the equation:

$$DR = 20\log\left[\frac{(ADC\ Max)}{(Read\ Noise)}\right];$$

where:

DR is dynamic range;

ADC Max is analog-to-digital converter maximum measurable level of pixel response; and Read Noise is analog-to-digital converter noise floor, corresponding to minimum measurable level of pixel response.

28. The system according to claim 27, wherein the relatively high dynamic range for the superpixel is given by the equation:

$$DRext = DR + 20\log\left[\left(\frac{Long\ Integration\ Time}{Short\ Integration\ Time}\right)*\left(\frac{High\ Gain}{Low\ Gain}\right)\right];$$

where:

DRext is extended dynamic range of the superpixel;

DR is dynamic range for a single pixel member of the superpixel;

Long Integration Time is a relatively long integration time associated with a single pixel member of the superpixel;

Short Integration Time is a relatively short integration time associated with a single pixel member of the superpixel;

High Gain is a relatively high signal gain associated with a single pixel member of the superpixel; and Low Gain is a relatively low signal gain associated with a single pixel member of the superpixel.

* * * * *